Oct. 5, 1943.　　　　E. E. MOYER　　　　2,331,131
ELECTRIC REGULATING CIRCUIT
Filed Sept. 28, 1940
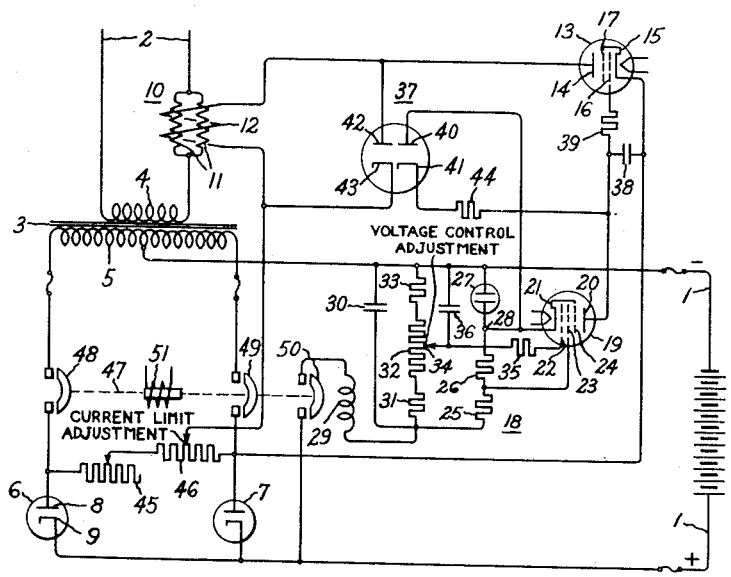
Inventor:
Elmo E. Moyer,
by Harry E. Dunham
His Attorney.

Patented Oct. 5, 1943

2,331,131

UNITED STATES PATENT OFFICE 2,331,131

ELECTRIC REGULATING CIRCUIT

Elmo E. Moyer, Scotia, N. Y., assignor to General Electric Company, a corporation of New York Application September 28, 1940, Serial No. 358,923

6 Claims. (Cl. 175—363)

My invention relates to electric circuits and more particularly to electric regulating circuits for systems including unidirectional conducting devices, such as electric valve means, for energizing a direct current load circuit.

In many applications, such as battery charging systems, it is important to supply a substantially constant unidirectional voltage to the associated load circuit for a predetermined range of power transfer and to decrease rapidly the voltage applied to the load circuit in the event the power tends to exceed a predetermined range. In accordance with the teachings of my invention described hereinafter, I provide a new and improved electric regulating system which operates to maintain the load voltage substantially constant and which protects the apparatus connected to the load circuit and the power transmitting circuit in the event the load current or power transfer tends to exceed a predetermined range.

It is an object of my invention to provide a new and improved electric regulating system.

It is another object of my invention to provide a new and improved electric regulating system for electric translating apparatus of the type comprising unidirectional conducting means such as electric valves.

It is another object of my invention to provide a new and improved voltage regulating circuit for apparatus which supplies unidirectional current to an associated load circuit.

It is a still further object of my invention to provide a new and improved voltage regulating circuit comprising electric valve means for maintaining the voltage applied to a load circuit substantially constant for a definite range of power transfer, and to decrease the load voltage in a predetermined manner in the event the power transfer tends to exceed the predetermined range.

Briefly stated, in the illustrated embodiment of my invention I provide an improved regulating system for supplying unidirectional current to a load circuit, such as a battery charging circuit, from an alternating current supply circuit. The system comprises a transformer and unidirectional conducting means such as electric valves, and also includes a variable impedance means such as a saturable reactance or reactor which is connected in series relation between the alternating current supply circuit and the transformer and which serves to maintain the load voltage constant for a definite range of power transfer. The reactor is provided with a control winding which is variably energized by means of an electric discharge device. The control winding and the electric discharge device are energized in response to the voltage of the secondary winding of the transformer which decreases substantially when the power transfer tends to exceed a predetermined range, thereby decreasing the load voltage. A voltage sensitive circuit or a voltage controlling circuit is also connected across the load circuit to control the conductivity of the electric discharge device and, hence, control the current transmitted to the control winding to maintain the load voltage constant when the power transfer is maintained within the predetermined range.

For a better understanding of my invention, reference may be had to the following description taken in connection with the accompanying drawing, and its scope will be pointed out in the appended claims. The single figure of the accompanying drawing diagrammatically illustrates my invention as applied to a battery charging system.

Referring now to the single figure of the drawing, my invention is diagrammatically illustrated as applied to a system for energizing a direct current load circuit 1, such as a battery charging circuit, from an alternating current circuit 2 through electric translating apparatus comprising a transformer 3 having a primary winding 4 and a secondary winding 5, and also includes unidirectional conducting means such as a pair of electric valves 6 and 7 which may be of the type comprising an anode 8, a cathode 9 and employing an ionizable medium such as a gas or a vapor. The transformer 3 and the electric valves 6 and 7 may be connected to operate as a biphase rectifier to transmit both half cycles of alternating current in rectified form to the battery circuit or load circuit 1.

Connected between the alternating current supply circuit 2 and the primary winding 4 of transformer 3, I provide a variable impedance means, such as a saturable inductive reactance or reactor 10, comprising a winding or windings 11 which are connected in series relation with the primary winding 4 and which operate as a variable impedance element. The reactor 10 also comprises a saturable magnetic core member (not shown) and includes a control winding 12, the current transmitted therethrough controlling the magnetization of the reactor 10 and controlling the effective impedance or inductive reactance of the windings 11. In this manner, the voltage impressed across primary winding 4 of transformer 3 is controlled.

In order to control the current transmitted through control winding 12, I provide an electric discharge device 13 preferably of the type employing an ionizable medium such as a gas or a vapor and including an anode 14, a cathode 15 and a control grid 16. The discharge device 13 may also be provided with a shield grid 17 which is preferably connected to the cathode 15. The anode-cathode circuit of the electric discharge device 13 may be connected in series relation with the control winding 12.

As a means for controlling the potential of the control grid 16 of electric discharge device 13 to vary the current through the control winding 12 and thereby to maintain the load voltage constant for a predetermined range of power transfer, I provide a voltage controlling circuit 18 connected across the load circuit 1. The voltage controlling circuit 18 comprises an electric discharge means 19, preferably of the high vacuum type, comprising an anode 20, a cathode 21, a control grid 22, a screen grid 23 and a suppressor grid 24 which is connected to the cathode 21. To increase the sensitivity of the electric discharge means 19 due to variations in the voltage of the direct current circuit 1, I provide a voltage divider comprising in series relation resistances 25 and 26 and a constant voltage device, such as a glow discharge valve 27. The common juncture 28 of the glow discharge valve 27 and resistance 26 is connected to the cathode 21, thereby maintaining its potential substantially constant. This voltage divider may be connected to be responsive to the voltage of the load circuit by being connected to another voltage divider which operates as a filter circuit and which includes a series connected inductance 29 and a capacitance 30 which are arranged to be connected across the load circuit through suitable controlling apparatus described hereinafter.

I provide a further voltage divider including serially connected resistances 31, 32 and 33 which may be connected in parallel with the voltage divider including resistances 25, 26 and glow discharge device 27. A voltage control or voltage adjusting contact 34 is connected to the control grid 22 through a current limiting resistance 35 and impresses on the control grid 22 a potential which varies in accordance with the load voltage. In this manner, the conductivity of the electric discharge means 19 is varied by means of variable control potentials impressed upon control grid 22 and screen grid 23. To improve the sensitivity of the voltage regulating circuit 18 and to filter the ripple or extraneous components of load voltage, I provide a capacitance 36 which may be connected across portions of the voltage divider including resistances 31, 32 and 33.

The electric discharge means 19 in conjunction with a unidirectional conducting device, such as an electric discharge path of an electric valve means 37, establishes across a capacitance 38 a variable unidirectional component of voltage which is impressed upon control grid 16 of electric discharge device 13, thereby controlling its conductivity. The capacitance 38 is connected between the cathode 15 and the control grid 16 through a resistance 39. The right-hand electric discharge path including an anode 40 and a cathode 41 of the electric valve means 37 and the electric discharge means 19 transmit current in opposite directions through the capacitance 38 to establish thereacross an alternating component of voltage and a variable unidirectional component of voltage in a manner described and claimed in my Patent 2,278,212, dated March 31, 1942.

The electric valve means 37 may also include a second electric discharge path including an anode 42 and a cathode 43 which are connected across the control winding 12 to permit the flow of current therethrough due to the decay of flux in the winding 12 when the current tends to decrease in this winding. A suitable current limiting resistance 44 may be connected in series relation with the right-hand discharge path of electric valve means 37 including anode 40 and the cathode 41.

The current supply means for energizing the control winding 12 and the electric discharge device 13 is connected to be responsive to the magnitude of the secondary voltage of the transformer 3 and may comprise a voltage divider including resistances 45 and 46. This current supply means serves to decrease the current transmitted to the control winding 12 when the power transfer tends to exceed a predetermined range, thereby substantially increasing the inductive reactance of windings 11 and substantially reducing the load voltage.

I provide circuit controlling means 47 including contacts 48 and 49 which are connected in series relation with the electric valves 6 and 7 and which control the energization of the current supplying means and which also includes contacts 50 which control the voltage controlling circuit 19, thereby effecting simultaneous control of these two elements of the system. The circuit control means 47 may comprise an actuating coil 51.

The operation of the embodiment of my invention shown in the single figure of the drawing will be explained by considering the system when it is operating to supply direct current to the load circuit 1 from the alternating current supply circuit 2 through transformer 3 and electric valves 6 and 7. Of course, the actuating coil 51 of the circuit controlling means 47 is energized to close contacts 48–50, inclusive, and thereby to close simultaneously the current supply means for control winding 12 and the voltage controlling circuit 18.

The magnitude of the voltage impressed on the load circuit 1, of course, depends upon the inductive reactance of the reactor 10. As the magnetization of the reactor 10 is increased, the inductive reactance decreases thereby decreasing the inductive reactance voltage drop thereacross and consequently raising the voltage impressed across the load circuit 1. Upon saturation of the core member of the reactor 15, the inductive reactance of the windings 11 is substantially reduced and consequently the voltage of the load circuit will be raised materially. During normal operation of the system for power transfers within the predetermined range, the voltage controlling circuit 18 varies the potential of control grid 16 to maintain the voltage impressed across load circuit 1 substantially constant. For example, if the load voltage tends to rise above the predetermined value, the conductivity or the current conducted by electric discharge means 19 will be increased, thereby decreasing the magnitude of the unidirectional biasing potential impressed on control grid 16 of electric discharge device 13 and consequently causing this discharge device to conduct a smaller amount of current. The reduction in the current transmitted through control winding 12 decreases the magnetization of the core member of reactor 10 and increases its inductive reactance, effecting a decrease in the magnitude of the voltage supplied to primary winding 4 and consequently effecting a decrease in the magnitude of the voltage impressed across load circuit 1. For decreases in the voltage of load circuit 1, the reverse operation takes place tending to restore the load voltage to the desired value.

If the amount of current or power transmitted from the alternating current circuit 2 to the load circuit 1 tends to rise above a predetermined value established by the setting of resistance 45 or 46, the voltage impressed across the load circuit 1 decreases very rapidly. This current limiting and voltage limiting function is obtained in the following manner: The increased impedance voltage drop through windings 11 of reactor 10, due to the increased power flow, reduces substantially the net voltage impressed across primary winding 4, consequently and correspondingly reducing the magnitude of the voltage appearing across secondary winding 5. Since control winding 12 and electric discharge device 13 are energized in accordance with the voltage of the secondary winding 5, the decrease in voltage of secondary winding 5 effects a corresponding decrease in the current transmitted through winding 12. This decrease in control winding current decreases the magnetization of the reactor 10 but increases the inductive reactance of the winding 11, still further reducing the net voltage impressed across the primary winding 4. In this manner it will be seen that if the load current or power transfer tends to rise above a definite value, the voltage impressed across the load circuit will decrease very rapidly, thereby affording a desirable limitation on the power transfer.

The manner in which the voltage controlling circuit operates to control the conductivity of the electric discharge device 13 will now be more fully considered. The electric discharge path, including anode 40 and cathode 41 of electric valve means 37, and the electric discharge means 19 conduct current in opposite directions through the capacitance 38 from the right-hand portion of secondary winding 5 of transformer 3. Viewing the voltage of the capacitance relative to control grid 16, the right-hand discharge path of electric valve means 37 tends to establish a positive charge on the capacitance and the electric discharge means 19 tends to establish a negative charge. The resultant unidirectional charge on the capacitance 38 is determined by the relative magnitudes or the difference in the magnitudes of the respective currents conducted by these discharge elements. Since these elements conduct current during the alternate half cycles of the voltage produced by secondary winding 5, there appears across capacitance 38 an alternating component of voltage which is substantially fixed in phase and has a phase displacement of substantially 90 electrical degrees in the lagging direction with respect to the alternating component of voltage applied to the anode-cathode circuit of electric discharge device 13. As the current conducted by the electric discharge means 19 is increased, the potential of grid 16 of electric discharge device 13 becomes less positive relative to the potential of the cathode 15 and the discharge device 13 conducts a smaller amount of current. Conversely, as the conductivity or current conducted by electric discharge means 19 is decreased, the potential of grid 16 of discharge device 13 becomes more positive relative to the potential of the cathode 15, and the discharge device 13 conducts a greater amount of current.

Adjustable contact 34 associated with resistance 32 permits adjustment of the voltage which is maintained across the load circuit 1. The magnitude of the current or power flow at which the current limit becomes effective is established by means of either resistance 45 or 46. By virtue of these features, the system is capable of application to load circuits of diversified nature.

Important advantages of apparatus built in accordance with my invention are the simplicity of construction and arrangement, and the facility and rapidity with which the current limitation is effected under fault or abnormal conditions. The output voltage of the translating system or the voltage impressed across the load circuit decreases very rapidly in the event a fault condition tends to cause a rapid increase in load current, thereby protecting both the load circuit and the translating apparatus.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a direct current load circuit, electric translating apparatus connected between said circuits and comprising a transformer having a primary winding and a secondary winding and unidirectional conducting means connected between said secondary winding and said direct current circuit, a saturable inductive reactance connected between said alternating current circuit and said primary winding and including a control winding for controlling the magnetization of said reactance, means energized in accordance with the voltage of said secondary winding comprising an electric discharge device energized from said secondary winding and having a grid for controlling the current through said control winding, and means energized in accordance with the voltage of said direct current circuit for impressing on said control grid a potential to maintain the load voltage substantially constant for a predetermined range of power flow between said alternating current circuit and said direct current circuit.

2. In combination, an alternating current supply circuit, a direct current load circuit, electric translating apparatus connected between said circuits and comprising a transformer having a primary winding and a secondary winding and unidirectional conducting means connected between said load circuit and said secondary winding, a saturable inductive reactance connected between said primary winding and said supply circuit and including a control winding, means for controlling the current transmitted through said control winding comprising an electric discharge device having an anode, a cathode and a control grid, means for energizing the anode-cathode circuit of said electric discharge device from said secondary winding in accordance with the voltage thereof, and means responsive to the voltage of said load circuit for impressing on said control grid a potential which varies in accordance with the voltage of said load circuit.

3. In combination, an alternating current supply circuit, a direct current load circuit, electric translating apparatus connected between said circuits and comprising a transformer having a primary winding and a secondary winding and unidirectional conducting means connected between said load circuit and said secondary winding, a saturable inductive reactance connected between said primary winding and said supply circuit and including a control winding, means energized in response to the voltage of said secondary winding for controlling the current transmitted through said control winding comprising an electric discharge device having an anode, a cathode and a control grid, the voltage supplied to the anode-cathode circuit of said electric discharge device from said secondary winding serving to decrease substantially the current transmitted to said control winding when the power transfer between said supply circuit and said load circuit tends to exceed a predetermined value, and means responsive to the voltage of said load circuit for impressing on said control grid a potential which varies to maintain the load voltage constant within a predetermined range of power transfer.

4. In combination, an alternating current supply circuit, a direct current load circuit, electric translating apparatus connected between said circuits and comprising a transformer having a primary winding and a secondary winding and unidirectional conducting means connected between said load circuit and said secondary winding, a saturable inductive reactance connected between said primary winding and said supply circuit and including a control winding, an electric discharge device having an anode, a cathode and a control grid for controlling the current transmitted through said control winding, means responsive to the voltage of said load circuit for impressing on said control grid a potential to maintain the voltage of said load circuit substantially constant within a predetermined range of power transfer between said supply circuit and said load circuit, and means responsive to the voltage of said secondary winding for energizing the anode-cathode circuit of said electric discharge device in a manner to decrease substantially the current transmitted to said control winding when the power transfer tends to exceed said predetermined range, the anode-cathode voltage reduction occasioned by the transformer impedance serving to produce a cumulative effect in reducing the load voltage when the power transfer tends to exceed said predetermined range.

5. In combination, an alternating current supply circuit, a direct current load circuit, electric translating apparatus connected between said circuits and comprising a transformer having a primary winding and a secondary winding and unidirectional conducting means connected between said load circuit and said secondary winding, a saturable inductive reactance connected between said primary winding and said supply circuit and including a control winding, an electric discharge device having an anode, a cathode and a control grid for determining the current transmitted through said control winding, means responsive to the voltage of said load circuit for impressing on said control grid a potential to maintain the load voltage constant for a predetermined range of power transfer between said supply circuit and said load circuit and including electric discharge means for providing an alternating component of potential and a variable undirectional component of potential, and means energized in response to the voltage of said secondary winding and connected to said control winding and the anode-cathode circuit of said electric discharge device to decrease substantially the current transmitted to said control winding when the power transfer tends to exceed said predetermined range.

6. In combination, an alternating current supply circuit, a direct current load circuit, electric translating apparatus connected between said circuits and comprising a transformer having a primary winding and a secondary winding and unidirectional conducting means connected between said load circuit and said secondary winding, a saturable inductive reactance connected between said primary winding and said supply circuit to control the voltage of said load circuit and including a control winding, an electric discharge device for controlling the current transmitted through said control winding and comprising an anode, a cathode and a control grid, means for variably energizing said control grid to maintain the load voltage constant within a predetermined range of power transfer comprising a voltage controlling circuit connected across said load circuit, current supply means connected to energize said control winding and the anode-cathode circuit of said electric discharge device and being connected across the secondary winding of said transformer, the change in voltage of said current supply means occasioned by the transformer impedance serving to produce a cumulative effect in reducing the load voltage when the power transfer tends to exceed said predetermined range, and circuit controlling means for simultaneously closing and opening said voltage controlling circuit and said current supply means.

ELMO E. MOYER.